Jan. 10, 1928.
F. E. WILSON
1,655,639
SEPTIC TANK
Filed Sept. 20, 1924
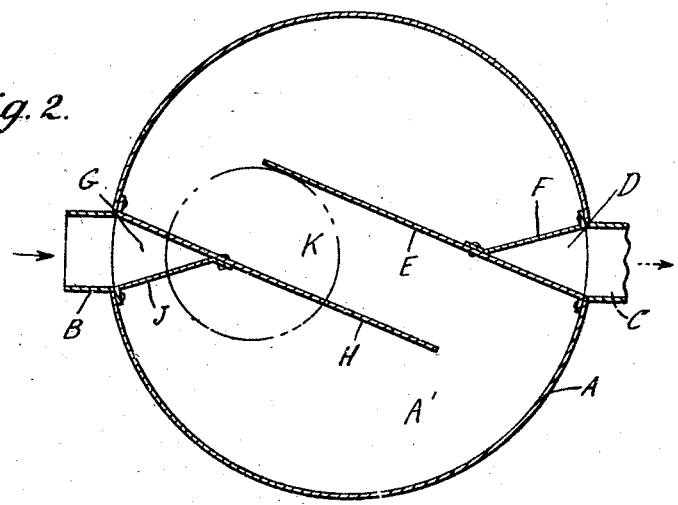
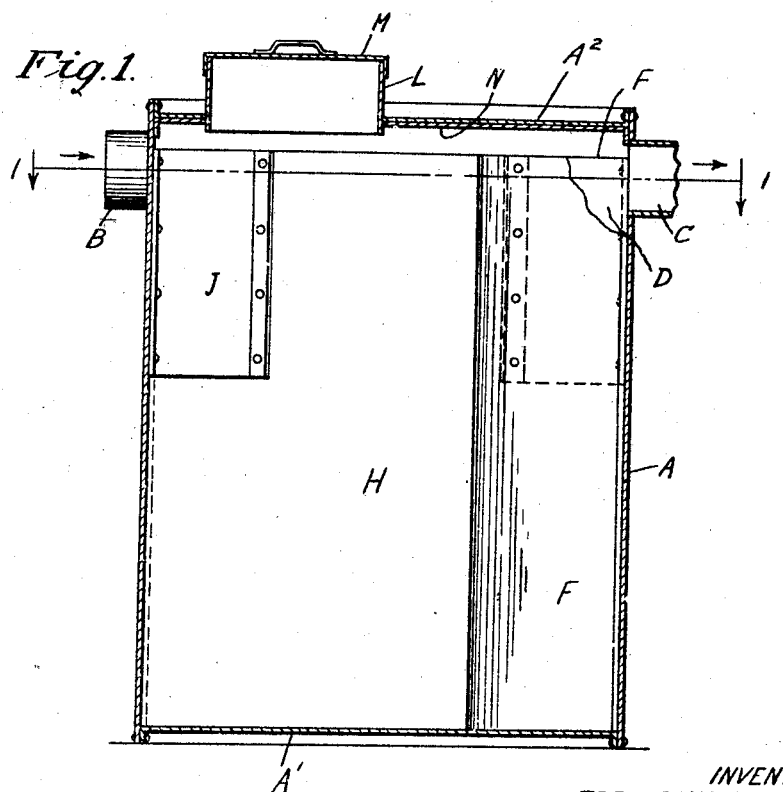
INVENTOR
FREDERICK E. WILSON
Parker, Prochnow & Bean
ATTORNEYS Patented Jan. 10, 1928.

1,655,639

UNITED STATES PATENT OFFICE.

FREDERICK E. WILSON, OF BUFFALO, NEW YORK.

SEPTIC TANK.

Application filed September 20, 1924. Serial No. 738,798.

This invention relates to sewage treating apparatus of the kind commonly known as septic tanks and in which the heavier and lighter parts of the sewage are separated and undergo certain changes due to bacteriological action within the tank.

The objects of this invention are to provide a septic tank which is so constructed that the capacity of the tank may be utilized to the best advantage for the settling of the sewage and for the bacteriological action within the tank; also to provide a tank of this kind which is economical to construct and efficient in operation and the interior of which is readily accessible for cleaning out or for inspection; also to provide a septic tank which may be built and assembled in a factory and shipped completely assembled, so that no skilled mechanics are required at the place where the tank is installed; also to improve the construction of septic tanks in other respects hereinafter specified.

In the accompanying drawings:

Fig. 1 is a sectional elevation of the septic tank embodying my invention with parts broken away to disclose the construction.

Fig. 2 is a transverse sectional view through the septic tank taken on line 1—1, Fig. 1.

The septic tank embodying my invention is preferably cylindrical in form and for this purpose is provided with a cylindrical outer wall A, a bottom wall A' and a top wall $A^2$. In tanks of this kind as heretofore constructed, it was customary to permit the sewage to enter at one side of the tank and to be discharged from the other side thereof. This arrangement of the inlet and outlet relatively to each other causes the sewage to travel across the tank mainly in the shortest path, and consequently the parts of the tank at the sides of this path are of very little use. In order to overcome this objection, the following construction is preferably employed.

The sewage enters into the tank through an inlet pipe B which is arranged at one side thereof adjacent to the upper portion of the tank, and the material discharged from the tank passes through a discharge pipe C, which connects with a vertical passage D formed between a baffle E and a baffle F. The baffle E extends from the bottom A' of the tank to within a short distance of the top $A^2$ of the tank A, while the baffle F extends from the top of the baffle E to a point preferably less than half way down the tank. The inlet pipe B connects with a vertical passage G similar to the passage D and formed between a baffle H and a baffle J. The baffles H and J occupy the same vertical space in the tank as the baffles E and F respectively, so that the septic tank is reversible with respect to its inlet and discharge pipes. The baffles E and H extend chordally or diagonally across the tank, and are spaced apart to form a passage K, thus providing a circuitous and positive path of travel for the sewage between the inlet and discharge pipes.

Owing to the fact that the bacteria which bring about the disintegration of the sewage matter form a scum at the upper portion of the tank, it is desirable that the incoming sewage should be conducted to a part of the tank below the scum so as not to interfere with this scum, which is essential to the successful operation of the septic tank. The passage G formed by the baffle J is adapted to accomplish this result as the baffle J terminates slightly above the middle of the tank. The material, after passing downwardly through the passage G begins to travel around the tank to the end of the baffle H, through passage K, around the tank on the outside of the baffle E and upwardly through passage D to discharge pipe C, thus providing the longest possible path of travel for the material. The tops of all baffles are arranged above the level of the liquid so that no flow takes place on the surface and the floating scum remains unbroken. Only the liquid from the intermediate portion of the tank adjacent the bottom of the baffle F is free to move upwardly in the passage D, so that none of the scum with the essential bacteria at the upper end of the tank can pass out of the discharge pipe C. In view of the fact that the passage D is far removed from the bottom of the tank, the lighter and heavier particles in the sewage have an ample opportunity to either pass to the upper surface of the liquid or sink to the bottom of the tank during the flow from the inlet pipe B to the discharge pipe C, and no material from the bottom of the tank containing essential bacteria will flow out of the discharge pipe C.

The septic tank is preferably provided in the upper wall A² with a man-hole or other opening L having a suitable cover M. This opening is preferably so located that the inlet passage G as well as adjacent passages are accessible for cleaning. The septic tank has the usual protective coating N on its inside above the water line to prevent corrosion of the metal by acids, gases and fatty materials and this protective coating may be of any desired form.

The tank described has the advantage that it can be made of sheet metal and can be assembled at a factory ready to be placed into the ground, and the arrangement of the walls within the tank is such that full capacity of the tank is made use of to good advantage. The tank described separates the sewage very effectively and is inexpensive to construct, and because of the means provided for the prevention of corrosion of the metal, the tank will last indefinitely.

I claim as my invention:—

1. A septic tank comprising a casing having an inlet and outlet, said outlet determining the level of the liquid in said casing and opening into the casing at a point below said level, baffle walls disposed in said casing and extending from opposite side walls across the interior of the casing but terminating in spaced relation to the wall opposite to that from which it extends, both of said baffle walls crossing the direct path of flow between the inlet and outlet extending from a point well below the maximum level of liquid in said casing to a point above the maximum level whereby the liquid passing between the inlet and outlet in said casing will be conducted in a circuitous path.

2. A septic tank comprising a casing having an inlet and outlet, said outlet determining the level of the liquid in said casing and opening into the casing at a point below said level, baffle walls disposed in said casing and extending from opposite side walls across the interior of the casing but terminating in spaced relation to the wall opposite to that from which it extends, both of said baffle walls crossing the direct path of flow between the inlet and outlet and extending from the bottom wall of the casing upwardly above the maximum level of the liquid in said casing, whereby the contents of the casing in passing between the inlet and outlet will be conducted in a circuitous path.

3. A septic tank comprising a casing having an inlet and an outlet in its lateral wall and spaced apart from one another peripherally of the casing, plates secured to opposite points of the side wall and extending into the interior of the casing and across the direct course of a liquid passing between the inlet and outlet, said walls extending from adjacent the bottom of the casing to a point well above the maximum liquid level in said casing, whereby a liquid entering the casing through said inlet will be conducted in a circuitous path to said outlet, and additional plates connected between the side walls at the opposite sides of the inlet and outlet from the first mentioned plates and said first plates at points a short distance from their anchored edge, said additional plates extending from above the maximum level in said casing downwardly into the liquid, whereby the ingoing liquid will meet the body of liquid in the casing at a point well below its surface, and the outgoing liquid will be removed from the casing at a point well below the upper level of the liquid.

4. A septic tank comprising an upright casing having inlet and outlet openings at approximately opposite portions of the lateral walls, and plates secured to the lateral walls of the casing at approximately opposite points and at the sides of the inlet and outlet and extending in opposite directions past one another as well as in spaced relation to one another, said plates extending from adjacent the bottom wall upwardly above the maximum level of liquid in the casing and terminating in spaced relation to the opposite part of the side wall, whereby liquid passing through the casing will be conducted in a circuitous path around the free vertical edges of said plates.

5. A septic tank comprising an upright casing having inlet and outlet openings at approximately opposite portions of the lateral walls, plates secured to the lateral walls of the casing at approximately opposite points and at the sides of the inlet and outlet and extending in opposite directions past one another as well as in spaced relation to one another, said plates extending from adjacent the bottom wall upwardly above the maximum level of liquid in the casing and terminating in spaced relation to the opposite part of the side wall, whereby liquid passing through the casing will be conducted in a circuitous path around the free vertical edges of said plates, and an additional plate connected between each of said first plates at a distance from its secured side edge to the lateral wall at the opposite side of the inlet or outlet from which that plate extends, said additional plates extending from above the maximum level of liquid in said casing to a point below the level, whereby the ingoing and outgoing liquid will not break the upper surface of liquid in said casing.

6. A septic tank comprising a casing having an inlet and outlet, both opening into the interior of the casing at points below the maximum level of liquid in the casing as determined by the outlet, and baffle plates secured to the lateral wall of the casing and extending across the path of direct flow between the inlet and outlet, from opposite sides of the casing in spaced relation past one another, said plates being formed to permit passage of a liquid from face to face at staggered points at opposite sides of the casing, whereby a liquid passing through said casing between the inlet and outlet will be conducted in a circuitous path.

FREDERICK E. WILSON.